United States Patent
Ravisankar et al.

(10) Patent No.: US 11,519,359 B1
(45) Date of Patent: Dec. 6, 2022

(54) LOW COMPRESSION NATURAL GAS ENGINE PISTON BOWL FOR IMPROVED COMBUSTION STABILITY

(71) Applicant: Caterpillar Inc., Peoria, IL (US)

(72) Inventors: Srikanth Ravisankar, Chennai (IN); Paul Jon Schweiger, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/712,576

(22) Filed: Apr. 4, 2022

(51) Int. Cl.
*F02F 3/28* (2006.01)
*F02F 3/20* (2006.01)
*F02B 23/10* (2006.01)
*F02F 3/24* (2006.01)
*F02B 43/10* (2006.01)

(52) U.S. Cl.
CPC .............. *F02F 3/24* (2013.01); *F02B 23/101* (2013.01); *F02B 43/10* (2013.01); *F02F 3/20* (2013.01); *F02F 3/28* (2013.01); *F02B 2023/108* (2013.01); *F02B 2043/103* (2013.01); *F02B 2275/40* (2013.01)

(58) Field of Classification Search
CPC ........ F02F 3/24; F02F 3/20; F02F 3/28; F02F 3/26; F02B 23/101; F02B 23/0672; F02B 43/10; F02B 2023/108; F02B 2043/103; F02B 2275/40; F16J 1/00; F16J 1/09
See application file for complete search history.

(56) References Cited

U.S. PATENT DOCUMENTS

| | | | |
|---|---|---|---|
| 6,182,630 B1 | 2/2001 | Zhu et al. | |
| 6,789,460 B2 | 9/2004 | Kohnert | |
| 8,813,713 B2 | 8/2014 | Gladden et al. | |
| 9,234,451 B2 | 1/2016 | Karch et al. | |
| 9,284,879 B2 * | 3/2016 | Dingreville | F02B 23/0672 |
| 9,429,101 B2 | 8/2016 | Nacke et al. | |
| 9,989,004 B2 | 6/2018 | Roe et al. | |
| 10,400,663 B2 | 9/2019 | Ness et al. | |
| 10,718,258 B2 | 7/2020 | Solomon et al. | |
| 2005/0066929 A1 * | 3/2005 | Liu | F02B 23/0672 123/193.4 |
| 2010/0108044 A1 * | 5/2010 | Liu | F02B 23/0672 123/664 |
| 2011/0146613 A1 * | 6/2011 | Oxborrow | F02B 23/063 123/193.6 |
| 2014/0076273 A1 * | 3/2014 | Yoo | F02B 23/0675 123/259 |
| 2016/0341147 A1 | 11/2016 | Burkhard et al. | |
| 2019/0186341 A1 * | 6/2019 | Ness | F02B 23/0621 |

FOREIGN PATENT DOCUMENTS

FR  2596808 A1  10/1987

* cited by examiner

*Primary Examiner* — Grant Moubry
(74) *Attorney, Agent, or Firm* — Law Office of Kurt J. Fugman LLC

(57) ABSTRACT

A piston may have an annular body including a crown portion defining a longitudinal axis, a radial direction perpendicular to the longitudinal axis, a plane containing the longitudinal axis and the radial direction, and a contoured combustion bowl. In the plane containing the longitudinal axis and the radial direction, the crown portion includes a radially outer squish surface, and a swirl pocket having a reentrant surface that extends axially downwardly and radially outwardly from the squish surface defining a tangent that forms a reentrant angle with the squish surface that ranges from 33.0 degrees to 37.0 degrees.

20 Claims, 3 Drawing Sheets

LOW COMPRESSION NATURAL GAS ENGINE PISTON BOWL FOR IMPROVED COMBUSTION STABILITY

TECHNICAL FIELD

The present disclosure relates generally to pistons that are used in internal combustion engines having a contoured piston bowl geometry with a reentrant surface. More specifically, the present disclosure relates to a piston having a contoured piston bowl geometry with a reentrant surface that may improve combustion stability in a low compression natural gas engine.

BACKGROUND

Internal combustion engines are routinely used in various industries to power machines and equipment. Examples of industries using such machines and equipment include marine, earth moving, construction, mining, marine, locomotive and agriculture industries, etc. In certain markets and market segments (e.g., marine engines), natural gas engines require a low compression ratio and a good combustion stability in order to meet environmental standards while also being economical to run.

More specifically, it has been traditionally found that a tradeoff or compromise exists between providing a gas engine with a high power output while also having a high combustion efficiency simultaneously. In some cases, the limits for emissions of unburned hydrocarbons are undesirably approached, risking exceeding these limits.

U.S. Pat. No. 9,234,451 B2 (the '451 patent) discloses a piston for a compression ignition internal combustion engine includes a body having a combustion face defining a combustion bowl, and the combustion face including a compound bowl surface, and a compound rim surface. The combustion face is profiled to balance a combustion efficiency property of the piston with the emissions properties of the piston. A ratio of the diameter of the combustion blow to a diameter of the cylinder blow is from 0.68 to 0.74. Other dimensioned and proportional features of the piston support low smoke and NOx production during operation.

However, the '451 patent does not address maximizing power output while also providing a low compression ratio natural gas engine.

SUMMARY OF THE DISCLOSURE

A piston configured to reciprocate in the bore of an engine according to an embodiment of the present disclosure is provided The piston may comprise an annular body including a crown portion defining a longitudinal axis, a radial direction perpendicular to the longitudinal axis, a plane containing the longitudinal axis and the radial direction, and a contoured combustion bowl. In the plane containing the longitudinal axis and the radial direction, the crown portion may include a top squish surface, and a swirl pocket having a reentrant surface that extends axially downwardly and radially outwardly from the top squish surface defining a tangent that forms a reentrant angle with the top squish surface that may range from 33.0 degrees to 37.0 degrees.

A piston configured to reciprocate in the bore of an engine according to another embodiment of the present disclosure is provided. The piston may comprise an annular body including a crown portion defining a longitudinal axis, a radial direction perpendicular to the longitudinal axis, a plane containing the longitudinal axis and the radial direction, and a contoured combustion bow. In the plane containing the longitudinal axis and the radial direction, the contoured combustion bowl may be radially surrounded by an annular cooling gallery that defines a maximum annular radial width, while the contoured combustion bowl may have a swirl pocket including a cylindrical surface defining a maximum diameter of the swirl pocket radially proximate to the maximum annular radial width of the cooling gallery. A ratio of the maximum diameter of the swirl pocket to the maximum annular radial width may range from 16.25 to 19.66.

A piston configured to reciprocate in the bore of an engine according to yet another embodiment of the present disclosure is provided. The piston may comprise an annular body including a crown portion defining a longitudinal axis, a radial direction perpendicular to the longitudinal axis, a plane containing the longitudinal axis and the radial direction, and a contoured combustion bowl. In the plane containing the longitudinal axis and the radial direction, the contoured combustion bowl may define a maximum axial depth measured from a planar squish surface to a bottom concave arcuate surface defining a bottom extremity of a swirl pocket, and a minimum axial depth measured from a plateaus surface to the planar squish surface. A ratio of the maximum axial depth of the contoured combustion bowl to the minimum axial depth may range from 1.87 to 2.26.

A combustion chamber of an engine comprising a bore of the engine with a bore diameter, a longitudinal axis, a radial direction perpendicular to the longitudinal axis, and a piston configured to reciprocate in the bore of the engine according to an embodiment of the present disclosure is provided. The piston may reciprocate from a top dead center position to a bottom dead position defining a compression height therebetween. The piston may also include an annular body including a crown portion and defining a plane containing the longitudinal axis and the radial direction, and a contoured combustion bowl. In the plane containing the longitudinal axis and the radial direction, the contoured combustion bowl may define a maximum axial depth measured from a planar squish surface to a bottom concave arcuate surface defining a bottom extremity of a swirl pocket. A ratio of the compression height to the maximum axial depth may range from 10.0 to 12.0.

DETAILED DESCRIPTION

Figure 1:
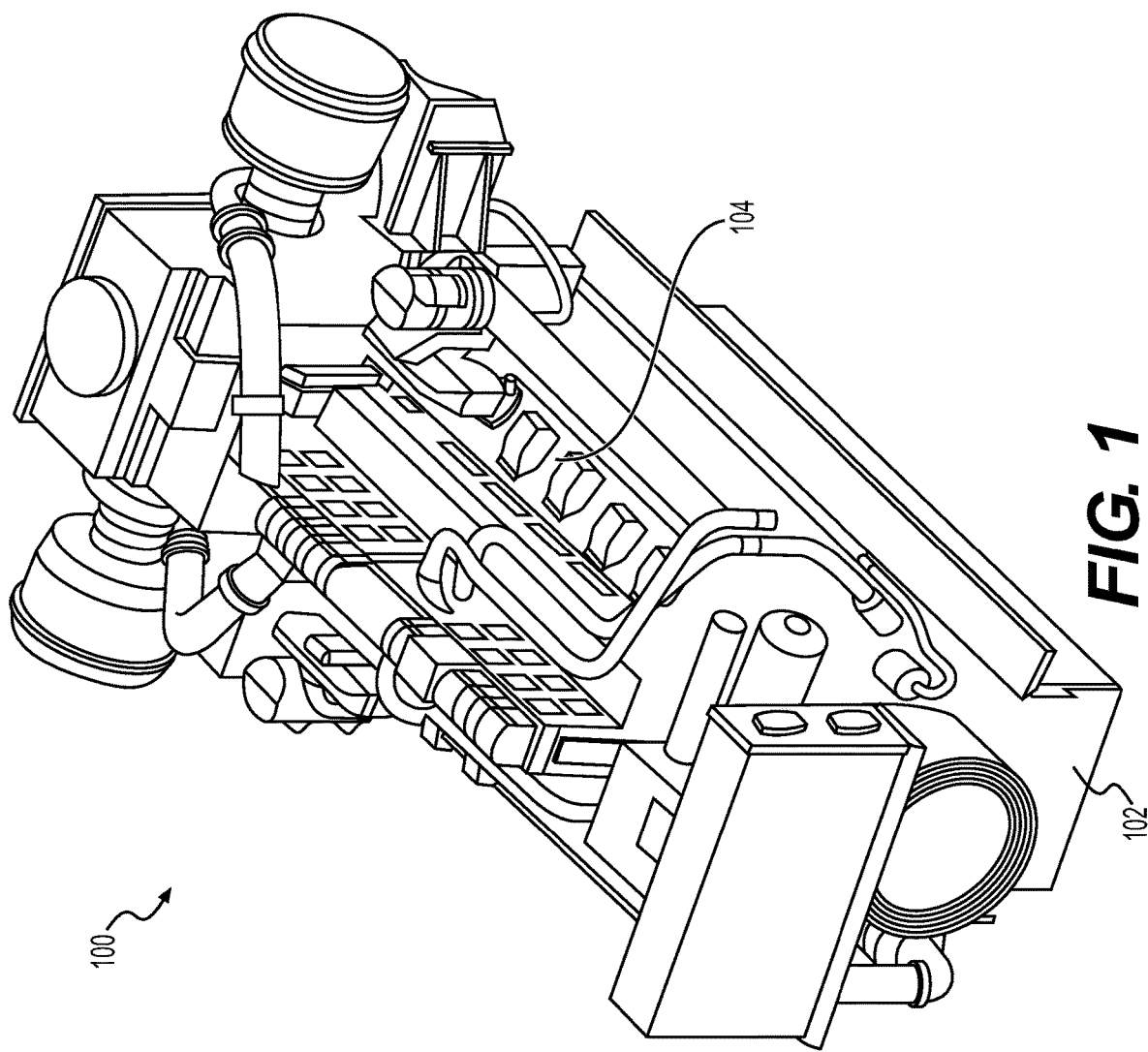
FIG. 1 is a perspective view of an internal combustion engine that may employ piston(s) configured according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or a prime indicator such as 100', 100"

etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

Various embodiments of a piston with a new bowl is disclosed that may meet engine performance goals and fit into a new piston architecture. The new bowl may have a maximized volume due to its depth and diameter, providing for a low geometric compression ratio. At the same time, a relatively high squish velocity to maximize total kinetic energy in the in-cylinder gas mixture has been maintained through utilization of a reentrant feature at the bowl opening. Also, a proper ratio of combustion volume in the bowl versus cooling volume in a cooling gallery may be provided. These combination of features may provide reduced piston temperatures, reduced unburned hydrocarbons, and improved combustion efficiency when the engine is operated at is its rated load.

For example, an internal combustion engine 100 is shown in FIG. 1 that may employ various embodiments of the piston constructed according to the principles set forth herein. The engine 100 may include an engine block 102 in which the piston (not shown) reciprocates, and a cylinder head 104 that may contain various engine components for the introduction of fluids into the bore/combustion chamber located in the engine block 102.

Figure 2:
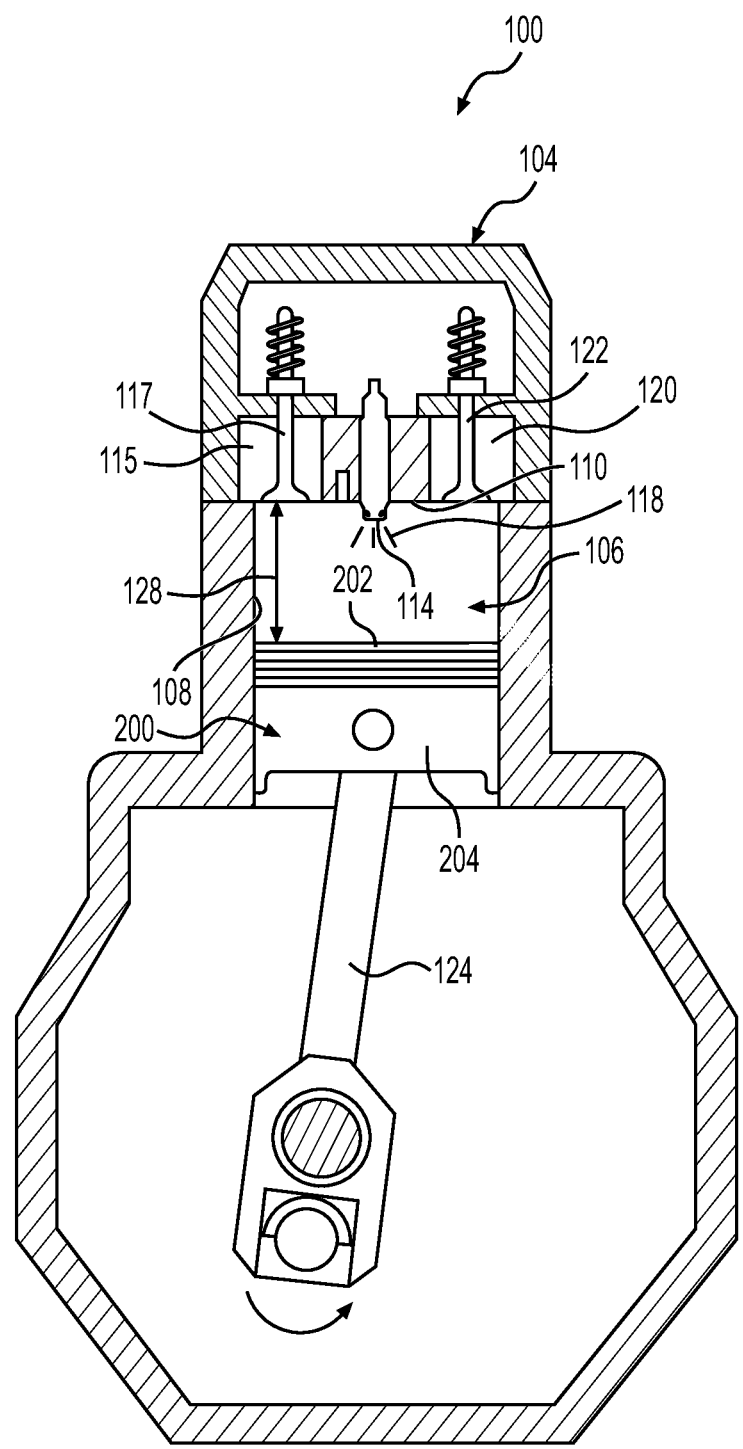
FIG. 2 is a sectioned side view of the internal combustion engine of FIG. 1, showing generically a combustion chamber with a piston that may be configured according to an embodiment of the present disclosure that is disposed in a cylinder bore for reciprocating movement therein.

Turning to FIG. 2, a portion of the engine 100 is shown sectioned, revealing the combustion chamber 106 that may have a generally cylindrical shape that is defined within a cylinder bore 108 formed within the crankcase or engine block 102 of the engine 100. The combustion chamber 106 is further defined at one end by a flame deck surface 110 of the cylinder head 104, and at another end by a crown portion 202 of a piston 200 that is reciprocally disposed within the bore 108, and is connected to a connecting rod 124 at its connecting rod attachment portion 204, which in turn is connected to a crank shaft (not shown).

During operation of the engine 100, air is admitted into the combustion chamber 106 an air inlet passage 115 when one or more intake valves 117 (one shown) are open during an intake stroke. In a known configuration, high pressure fuel is permitted to flow into a pre-chamber to mix with the intake air to create a pre-determined fuel/air mixture. A spark is created by a spark plug 114 to ignite the mixture that results in burning and expanding gases 118. Following combustion, exhaust gas is expelled from the combustion chamber through an exhaust conduit 120 when one or more exhaust valves 122 (one shown) is/are open during an exhaust stroke.

While a gas engine has been just described in detail, it is to be understood that the embodiments described herein may also be used in diesel and/or compression ignition engines.

The uniformity and extent of fuel/air mixing in the combustion cylinder is relevant to the combustion efficiency as well as to the amount and type of combustion byproducts that are formed. For example, fuel-rich mixtures, which may be locally present within the combustion chamber 106 during a combustion event due to insufficient mixing, may lead to higher nitrogen oxides and unburned carbon emissions and lower combustion efficiency.

Figure 3:
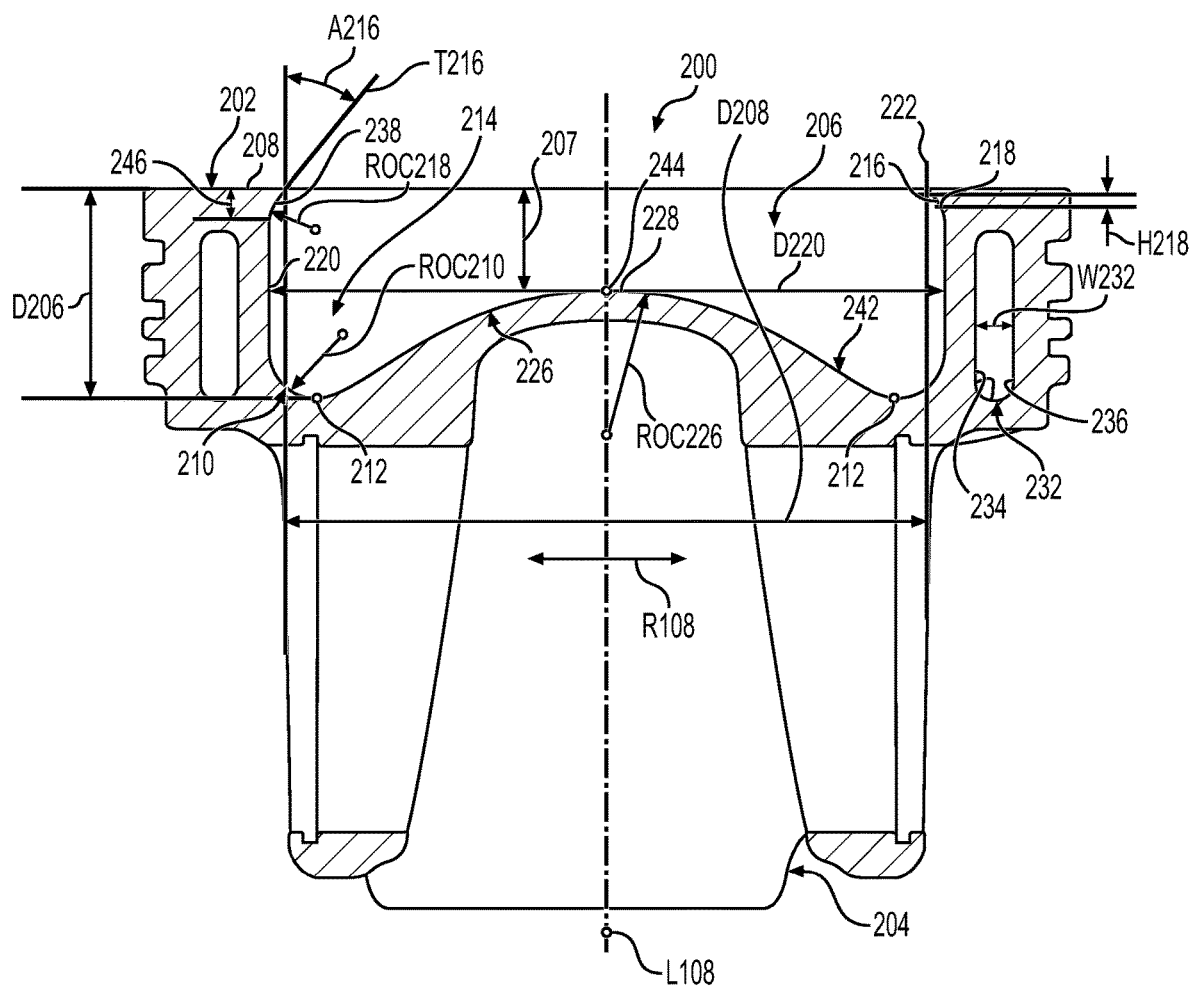
FIG. 3 is a sectional view of a piston that may be disposed in the combustion chamber of FIG. 2.

In particular embodiments of the present disclosure as understood looking at FIGS. 2 and 3 together, the combustion chamber 106 defines a bore 108 of the engine with a longitudinal axis L108, and a radial direction R108 perpendicular to the longitudinal axis. A piston 200 is shown in the bore that is configured to reciprocate in the bore of the engine from a top dead center position to a bottom dead position as nearly shown in FIG. 2, defining a compression height 128 between these positions.

As best seen in FIG. 3, the piston 200 may have an annular body including a crown portion 202 that defines a plane containing the longitudinal axis L108, and the radial direction R108 when installed. It is to be understood that the annular body of the piston may itself define similar axes, and directions when not in the bore of the engine, but would be coincident or nearly coincident with those of the bore when installed in the bore. Also, a skirt 204 is shown that may be a full skirt in some embodiments of the present disclosure. This may not be the case in other embodiments of the present disclosure. The skirt and the crown portion may be unitary, integral, etc.

The piston also has a contoured combustion bowl 206, and in the sectioned plane of FIG. 3, which contains the longitudinal axis L108 and the radial direction R108, defines a maximum axial depth D206 measured from a planar squish surface 208 (or a plane containing this surface) to a bottom concave arcuate surface 210 defining a bottom extremity 212 of a swirl pocket 214 (so called since it promotes mixing and atomization of the fuel in the air to help improve combustion efficiency). A ratio of the compression height 128 of the piston to the maximum axial depth D206 may range from 10.0 to 12.0 (e.g., about 11.0) in some embodiments of the present disclosure. Such a range may be considered to provide a low geometric compression ratio. The maximum axial depth D206 may range from 30.7 millimeters to 34.7 millimeters (e.g., about 32.7 mm). It should be noted that the compression height is most accurately portrayed in FIG. 2, as what is shown in FIG. 3 is an approximation of the compression height as it generally represents the amount of movement of the piston.

Also, the contoured combustion bowl 206 may include a reentrant surface 216 extending from the planar squish surface 208 at a reentrant angle A216 in the sectioned plane of FIG. 3, and a concave arcuate side surface 218 that extends axially downwardly from the reentrant surface 216 defining an axial height H218 of the concave arcuate side surface 218. In some embodiments the reentrant angle A216 ranges from 30.0 degrees to 40.0 degrees.

As shown, the concave arcuate side surface 218 of the swirl pocket 214 may be spaced axially away from the planar squish surface 218 (i.e., other surfaces are interposed such as the reentrant surface 216, etc.), as well as a cylindrical surface 220 (i.e. has less than 7.0 degrees of a draft angle) that defines a maximum diameter D220 of the swirl pocket 214 that ranges from 103.3 millimeters to 107.3 millimeters (e.g., about 105.3 millimeters). A ratio of the maximum axial depth D206 of the contoured combustion bowl to the predetermined axial distance 246 that the cylindrical surface is spaced away from the squish surface may range from 4.0 millimeters to 6.0 in some embodiments of the present disclosure. Also a ratio of the maximum axial depth D206 to a minimum axial depth 207 measured from a plateau surface 228 to the planar squish surface 208 may range from 1.87 to 2.26 (e.g., about 2.065) in some embodiments of the present disclosure.

Specific geometric values may include the following. A small radius 222 may connect the planar squish surface 208 to the reentrant surface 216 in some embodiments of the present disclosure (e.g., may have a value of 0 to 0.2 mm, or about 0.1 mm in the sectioned plane of FIG. 3). In addition, the planar squish surface 208 (with the small radius 222 if present) may define an entry diameter D208 that ranges from 98.0 millimeters to 102.0 millimeters in some embodiments of the present disclosure. Other dimensional ranges are possible in other embodiments of the present disclosure such as when the design is scaled up or down, etc.

Still referring to the sectioned plane of FIG. 3, the crown portion 202 may include a top squish surface (e.g., may take the form of the planar squish surface 208 as alluded to earlier herein), and a reentrant surface 216 that extends axially downwardly and radially outwardly from the top squish surface (or planar squish surface 208) that defines a tangent T216 that forms a reentrant angle A216 with the top squish surface that ranges from 33.0 degrees to 37.0 degrees (e.g., about 35.0 degrees) in some embodiments. The reentrant surface may take various shapes including arcuate, or conical as shown in FIG. 3. If so, the tangent T216, and the reentrant surface 216 may look or act like one in the same.

As also alluded to earlier herein, the swirl pocket 214 further includes a concave arcuate surface (e.g., concave arcuate side surface 218) extending from the reentrant surface 216, defining a radius of curvature ROC218 that ranges from 3.0 millimeters to 7.0 millimeters (or 4.0 millimeters to 6.0 millimeters) in the sectioned plane of FIG. 3 in some embodiments of the present disclosure. Also, the concave arcuate surface may be an exact radius, but not necessarily so. As used herein, the term "arcuate" means any surface that is not conical or planar, and may include a radius, radii, an ellipse, a spline, a polynomial, etc.

As mentioned previously herein, the swirl pocket 214 may have a cylindrical surface 220 extending axially downwardly from the concave arcuate surface, as well as a concave bottom extremity defining surface (e.g., see bottom concave arcuate surface 210 defining a bottom extremity 212) extending from the cylindrical surface 220. A convex arcuate surface 226 may extend upwardly from the concave bottom extremity defining surface to a plateau surface 228 (i.e., may be a convex arcuate surface as shown, arcuate then flat, etc.) that is perpendicular to the longitudinal axis L108.

The concave bottom extremity defining surface (e.g., may take the form of bottom concave arcuate surface 210) may have a radius of curvature ROC210 that ranges from 6.6 millimeters to 8.6 millimeters, while the convex arcuate surface 226 may have a radius of curvature ROC226 that ranges from 53.0 millimeters to 55.0 millimeters in some embodiments of the present disclosure.

While the previous embodiments of the piston have been directed to those that maximize power output without sacrificing combustion efficiency or stability, the next embodiment is more concerned with piston temperatures so that they are not too high, etc.

For example, in the sectioned plane of FIG. 3, the contoured combustion bowl 206 may be radially surrounded by an annular cooling gallery 232 that defines a maximum annular radial width W232. Moreover, the contoured combustion bowl 206 may have a swirl pocket including a cylindrical surface 220 defining a maximum diameter D220 of the swirl pocket 214 that is disposed radially proximate to the maximum annular radial width W232 of the cooling gallery. In some embodiments, a ratio of the maximum diameter D220 to the maximum annular radial width W232 ranges from 15.86 to 19.19 (e.g., about 17.447).

More particularly, the annular cooling gallery 232 may define a radially inner cylindrical surface 234, and a radially outer cylindrical surface 236 that defines the maximum annular radial width W232 of the annular cooling gallery 232. Also, the swirl pocket 214 may further include a conical converging surface 238 (may take the form of the reentrant surface 21) and extending radially inwardly, and axially upwardly from the cylindrical surface 220 of the swirl pocket 214.

At the bottom of the swirl pocket 214, an undulating surface 242 may extend axially downwardly and radially inwardly from the cylindrical surface 220 of the swirl pocket to a bottom extremity 212 of the swirl pocket, and then radially inwardly and axially upwardly to a plateau surface 228 (with a peak 244), and spaced away from the squish surface an axial depth of about 15.9 millimeters in some embodiments of the present disclosure. In other embodiments, surface 228 may be arcuate, etc.

The configuration, ratios and dimensional ranges of any of the features of any of the embodiments discussed herein may be altered to be different than what has been explicitly discussed or shown depending on the application.

The piston may be fabricated from steel (e.g., tool steel, stainless steel, etc.), cast aluminum alloy, forged aluminum alloy or other suitable material that is durable, corrosion resistant, etc. The geometry of the crown portion may be formed during the casting or forging process and then may be rough machined and/or finish machined if necessary. Suitable machining processes may include milling, turning, electrical discharge machining, etc.

Since a turning process is used to create some or all of the finished geometry of the piston, it can be readily understood by one skilled in the art that most, almost all, or all of the finished geometry of these components may not vary, or may not vary significantly, along the circumferential direction about the longitudinal axis.

INDUSTRIAL APPLICABILITY

In practice, a piston, a crown portion of a piston, a combustion chamber, and/or an engine assembly using any of these components according to any embodiment described herein may be provided, sold, manufactured, and bought etc. as needed or desired in an aftermarket or OEM (original equipment manufacturer) context. For example, a crown portion or a piston may be used to retrofit an existing engine already in the field or may be sold with an engine or a piece of equipment using that engine at the first point of sale of the piece of equipment.

The inventors have found that the selected bowl geometry facilitates a balance between low compression ratio, high squish velocity, and effective cooling of the bowl rim and top land. Other designs may be able to achieve the same low compression ratio, but would likely sacrifice the desired squish velocity or the desired amount of cooling.

Put another way, various embodiments of the present disclosure break the tradeoff between increasing power output using a low compression ratio, and improving combustion efficiency simultaneously.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A piston configured to reciprocate in the bore of an engine, the piston comprising:
   an annular body including a crown portion defining a longitudinal axis, a radial direction perpendicular to the longitudinal axis, a plane containing the longitudinal axis and the radial direction, and a contoured combustion bowl;
   wherein in the plane containing the longitudinal axis and the radial direction
      the crown portion includes a top squish surface, and a swirl pocket having a reentrant surface that extends axially downwardly and radially outwardly from the top squish surface defining a tangent that forms a reentrant angle with the top squish surface that ranges from 33.0 degrees to 37.0 degrees.

2. The piston of claim 1, wherein the reentrant surface is conical.

3. The piston of claim 1, wherein the swirl pocket further includes a concave arcuate surface extending from the reentrant surface, defining a concave arcuate surface radius of curvature that ranges from 4.0 millimeters to 6.0 millimeters in the plane containing the longitudinal axis and the radial direction.

4. The piston of claim 3, wherein the concave arcuate surface is an exact radius.

5. The piston of claim 4, wherein the swirl pocket further comprises a cylindrical surface extending axially downwardly from the concave arcuate surface, a concave bottom extremity defining surface extending from the cylindrical surface, a convex arcuate surface extending upwardly from the concave bottom extremity defining surface to a plateau surface that is perpendicular to the longitudinal axis.

6. The piston of claim 5, wherein the plateau surface is formed by a convex arcuate surface, and the concave bottom extremity is formed by a concave radius.

7. The piston of claim 6, wherein the cylindrical surface defines a maximum diameter of the swirl pocket, the concave radius defines a concave radius of curvature ranging from 6.6 mm to 8.6 mm, and the convex arcuate surface defines a convex radius of curvature ranging from 53.0 mm to 55.0 mm.

8. A piston configured to reciprocate in the bore of an engine, the piston comprising:
   an annular body including a crown portion defining a longitudinal axis, a radial direction perpendicular to the longitudinal axis, a plane containing the longitudinal axis and the radial direction, and a contoured combustion bowl;
   wherein in the plane containing the longitudinal axis and the radial direction, the contoured combustion bowl is radially surrounded by an annular cooling gallery that defines a maximum annular radial width, the contoured combustion bowl has a swirl pocket including a cylindrical surface defining a maximum diameter of the swirl pocket radially proximate to the maximum annular radial width of the annular cooling gallery, and a ratio of the maximum diameter of swirl pocket to the maximum annular radial width ranges from 15.86 to 19.19.

9. The piston of claim 8, wherein the annular cooling gallery defines a radially inner cylindrical surface, and a radially outer cylindrical surface that defines the maximum annular radial width of the annular cooling gallery.

10. The piston of claim 8, wherein the swirl pocket further includes a conical converging surface extending radially inwardly, and axially upwardly from the cylindrical surface of the swirl pocket.

11. The piston of claim 10, wherein the swirl pocket further comprises a concave arcuate surface extending between the conical converging surface, and the cylindrical surface.

12. The piston of claim 11, wherein the swirl pocket further comprise an undulating surface that extends axially downwardly and radially inwardly from the cylindrical surface of the swirl pocket to a bottom extremity of the swirl pocket, and then radially inwardly and axially upwardly to a peak disposed at the longitudinal axis.

13. A piston configured to reciprocate in the bore of an engine, the piston comprising:
   an annular body including a crown portion defining a longitudinal axis, a radial direction perpendicular to the longitudinal axis, a plane containing the longitudinal axis and the radial direction, and a contoured combustion bowl;
   wherein in the plane containing the longitudinal axis and the radial direction, the contoured combustion bowl defines a maximum axial depth measured from a planar squish surface to a bottom concave arcuate surface defining a bottom extremity of a swirl pocket, and a minimum axial depth measured from a plateau surface to the planar squish surface, and a ratio of the maximum axial depth of the contoured combustion bowl to the minimum axial depth ranges from 1.87 to 2.26.

14. The piston of claim 13, wherein the contoured combustion bowl further comprises a cylindrical side surface that defines a maximum diameter of the swirl pocket that ranges from 103.3 millimeters to 107.3 millimeters.

15. The piston of claim 13, wherein the planar squish surface defines an entry diameter that ranges from 98.0 millimeters to 102.0 millimeters.

16. The piston of claim 13, further comprising a radius extending axially upwardly toward the planar squish surface that defines a radius of curvature ranging from 3.0 millimeters to 7.0 millimeters.

17. The piston of claim 13, wherein the maximum axial depth of the contoured combustion bowl ranges from 30.7 millimeters to 34.7 millimeters.

18. A combustion chamber of an engine comprising:
- a bore of the engine with a bore diameter, a longitudinal axis, a radial direction perpendicular to the longitudinal axis; and
- a piston configured to reciprocate in the bore of the engine from a top dead center position to a bottom dead position defining a compression height therebetween, the piston including
- an annular body including a crown portion and defining a plane containing the longitudinal axis and the radial direction, and a contoured combustion bowl;
- wherein in the plane containing the longitudinal axis and the radial direction, the contoured combustion bowl defines a maximum axial depth measured from a planar squish surface to a bottom concave arcuate surface defining a bottom extremity of a swirl pocket, and a ratio of the compression height to the maximum axial depth ranges from 10.0 to 12.0.

19. The combustion chamber of claim 18, wherein the contoured combustion bowl includes a reentrant surface extending from the planar squish surface at a reentrant angle in the plane containing the longitudinal axis and the radial direction, and a concave arcuate side surface that extends axially downwardly from the reentrant surface to a cylindrical side surface, that leads axially downwardly an undulating surface.

20. The combustion chamber of claim 19, wherein the reentrant angle ranges from 30.0 degrees to 40.0 degrees.

* * * * *